March 21, 1939.   G. T. SMITH-CLARKE   2,151,624
BUILT-UP CRANKSHAFT
Filed March 8, 1938
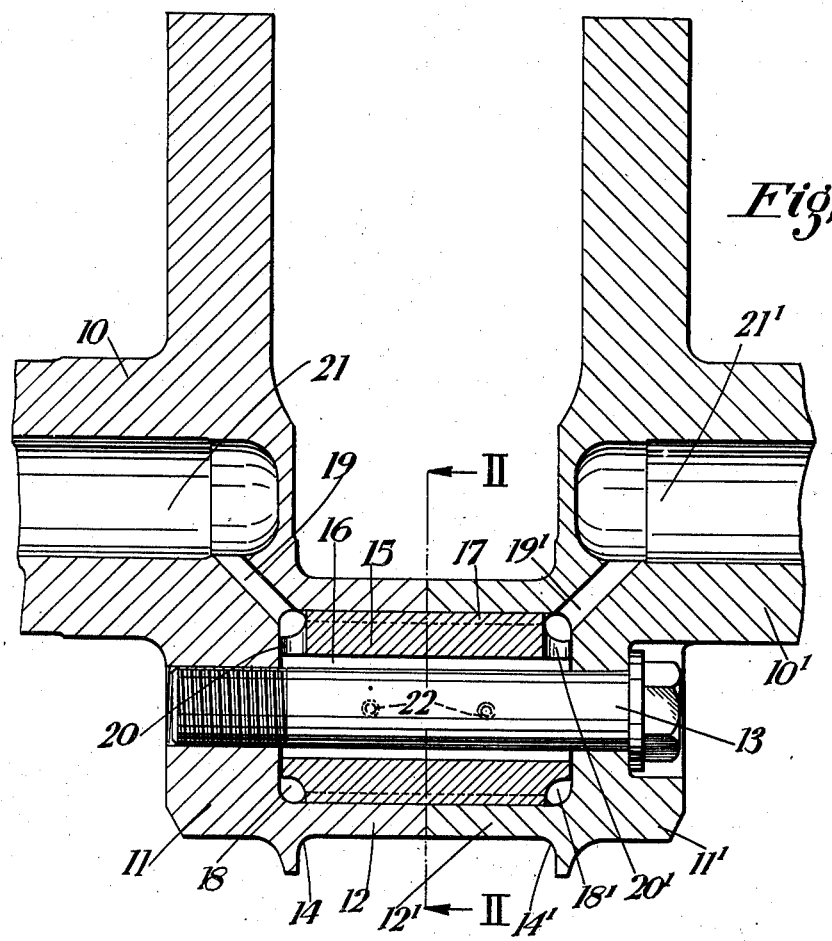
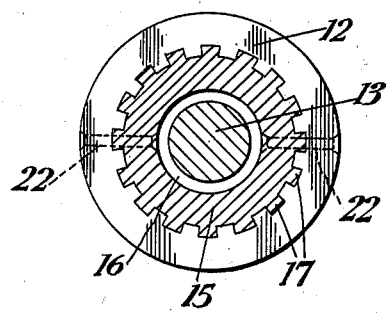
Inventor
George Thomas Smith-Clarke
by Mawhinney & Mawhinney
Attorneys.

Patented Mar. 21, 1939

2,151,624

UNITED STATES PATENT OFFICE 2,151,624

BUILT-UP CRANKSHAFT

George Thomas Smith-Clarke, Coventry, England

Application March 8, 1938, Serial No. 194,645
In Great Britain December 14, 1937

3 Claims. (Cl. 74—598)

This invention relates to a built-up crankshaft, for an internal-combustion engine, of the kind having coaxial hollow portions of a crankpin which are secured together end-to-end, as by means of a through bolt—this latter term being herein used in a generic sense to include any equivalent fixing. Preferably the coaxial hollow portions are in the main of equal lengths.

In one form of crankshaft of this kind, which has been used in the past, the coaxial hollow portions have been provided with integral spigotting ends having a male and female splined or like keying connection with one another. In that case difficulties arise in manufacture and functioning, as it is not commercially possible to make the said male connection without introducing an undesirable concentration of stress at the juncture of the parts.

It is my main object to provide an improved arrangement with which this difficulty will be avoided, whilst, in addition, the parts can be inexpensively manufactured and assembled, and the resulting structure can be one of greater strength.

In the accompanying drawing:

Figure 1 is a fragmentary sectional elevation through one form of crankshaft according to the invention, particularly for a so-called radial engine; and Figure 2 is a cross-section taken on the line II—II of Figure 1.

The drawing shows a built-up crankshaft with two coaxial portions $10$, $10^1$ which can be supported in main bearings and are formed with integral crank arms $11$, $11^1$ carrying coaxial hollow portions $12$, $12^1$ which constitute the crankpin. These portions $12$, $12^1$ are bolted to one another end-to-end by means of a through bolt $13$ which is here shown as screwing directly into one of the crank arms $11$ whilst its head lies in a recess in the other $11^1$. The big-end bearing can be located on the crankpin by means of the shoulders $14$, $14^1$ thereof.

In the present instance there is fitted into the tubular portions $12$, $12^1$ a sleeve $15$ which has clearance $16$ round the bolt $13$, the sleeve being formed with external splines $17$ which are engaged with corresponding internal grooves formed on the hollow portions $12$, $12^1$. For location purposes the sleeve may be a drive fit in one of the portions and a sliding fit in the other. At its ends are formed two circumferential grooves $18$, $18^1$ which communicate directly with passages $19$, $19^1$ formed in the adjacent crank arms and with a number of radial passages $20$, $20^1$ leading to the clearance space $16$.

With the arrangement described the parts can be inexpensively manufactured and assembled and also arranged to be of robust construction. In particular, the sleeve may be of a high-tensile alloy steel in a condition of maximum strength, the remainder of the crankshaft being case- or surface-hardened in a known manner. Lubricant can be distributed between the hollows $21$, $21^1$ of the crankshaft by way of the passages $19$, $20$, $18$, $20^1$ and $19^1$, and for supplying lubricant to the big-end bearing the hollow portions $12$, $12^1$ and the sleeve $15$ will be drilled as desirable, for example, as shown at $22$; but naturally the number, disposition and size of such bores $22$ will depend on the particular requirements of the engine.

What I claim as my invention and desire to secure by Letters Patent of the United States is:

1. A built-up crankshaft having two crank arms, coaxial hollow crankpin portions carried thereby, a through bolt securing said portions to one another end-to-end, a separate rigid sleeve fitting said portions and disposed round said bolt with clearance, and a splined connection between said portions and said sleeve, said sleeve having circumferential grooves at its ends communicating with lubrication passages formed in said crank arms and leading to the clearance round said bolt.

2. A built-up crankshaft having two crank arms, coaxial tubular crankpin portions integral therewith, said portions being of the same dimensions, internal splines formed in said portions, a rigid sleeve with external splines fitted into said portions, and a bolt screwed into one of said crank arms and having its head in a recess in the other of said crank arms and serving for securing said portions together end-to-end, said bolt having clearance from said sleeve, and said portions and sleeve being drilled to provide a plurality of bores leading to the clearance round said bolt.

3. A crankshaft part comprising arms having separable tubular pin parts, a unitary sleeve extending in common substantially the full length of the two pin parts when assembled end to end, said sleeve fitting on its outer side against the internal surfaces of the two pin portions, said sleeve and pin portions having interlocking engagement along their meeting faces, and means to hold the two pin parts together on said sleeve.

GEORGE T. SMITH-CLARKE.